United States Patent Office 3,552,955
Patented Jan. 5, 1971

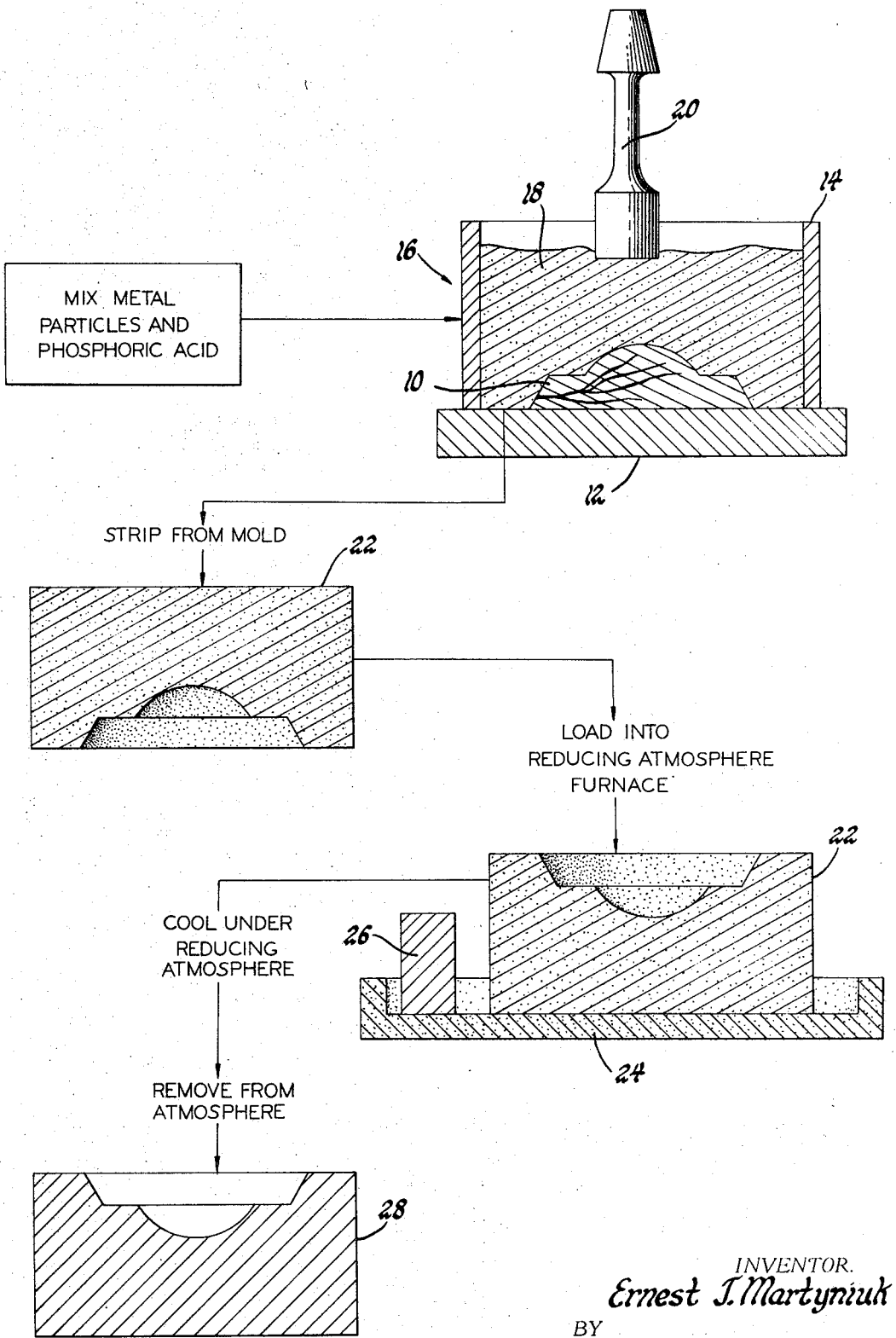

3,552,955
METHOD OF MAKING TOOLS FROM METAL PARTICLES
Ernest T. Martyniuk, Troy, Mich., assignor to General Motors Corporation, Detroit, Mich., a corporation of Delaware
Filed Nov. 13, 1968, Ser. No. 775,453
Int. Cl. B22f 3/26
U.S. Cl. 75—212                                  4 Claims

ABSTRACT OF THE DISCLOSURE

A method of forming tools such as dies, electrical discharge machining electrodes, assembly line fixtures and the like from relatively small metal particles is disclosed. In a preferred embodiment, $Fe_3O_4$ or CuO coated metal particles are first wetted with a film of concentrated phosphoric acid and a quantity of the acid wetted, oxide coated particles are immediately molded into a mass of predetermined configuration. A metal phosphate chemical bond quickly forms to temporarily bond the particles together, they are subsequently sintered in a reducing atmosphere and then infiltrated with a suitable braze alloy.

---

This invention is related to the manufacture of machine tools such as dies, electrodes, fixtures and the like. More particularly, this invention is related to a method of forming such tools from small metal particles.

It is well recognized that to obtain high productivity it is necessary to build and employ suitable machine tools. However, the manufacture of such tools is typically an expensive and time consuming project. For the most part the tools are formed from a suitable metal. If the tool is prepared from a solid block of the metal, expensive machining operations are required. If the tool is cast, suitable patterns and molds must be furnished and typically some machining of the final casting is still required. Some tool members have been produced from metal powders in the hope of avoiding both the drawbacks of the extensive machining of solid metal and the handling of molten metal. However, it has been necessary to compact or compress such metal particles under great loads so that they stick together in a self-sustaining body until a sintering or other suitable bonding operation is accomplished. Therefore, to produce tools from metal powder it has heretofore been necessary to initially provide strong dies and presses which merely shifts the original problem of quickly and cheaply producing a machine tool back one step in the sequence of operations.

Accordingly, it is an object of the present invention to provide a method of forming a machine tool or the like from a quantity of loose metal particles wherein the particles are initially held together in a predetermined shape by means of a chemical binder, the chemical binder subsequently being eliminated and ultimately replaced with an infiltrated braze alloy which metallurgically bonds the particles in a unitary tool member.

It is another object of the present invention to provide a method of forming a tool from metal particles wherein the tool is molded from loose particles at modest pressures with relatively soft and inexpensive patterns and molds.

It is a more specific object of the present invention to provide a method of making a tool member from metal particles wherein a quantity of the particles are molded into a desired shape and bonded together therein by means of a metal phosphate chemical bond. The chemical bond serves to temporarily hold the particles together until the mass of particles can be infiltrated with a suitable braze alloy thereby forming a relatively hard and strong tool member.

In accordance with a preferred embodiment of my invention these and other objects are accomplished by first providing iron shot having a particle size range of about 0.007" to 0.014" in diameter. The iron shot is heated in air at 900°–1400° F. for about ten minutes wherein a thin, blue oxide coating, $Fe_3O_4$, is formed on the surface. The oxide coated iron powder is mixed with a small amount of phosphoric acid suitable to wet the surface of the particles. Phosphoric acid reacts chemically with the blue iron oxide coating to form a complex iron phosphate adhesive which readily bonds adjacent iron particles together. Since the phosphoric acid wetted particles will soon begin to adhere to each other they are immediately formed into a tool member of desired configuration. This may be done, for example, by packing the powder around a wooden pattern within a suitable mold box. The particles are tamped down so that they are packed close together to obtain a stronger and more dense article. When the compacted particles have stood for a few hours the iron phosphate adhesive hardens and the molded tool member becomes self-sustaining, and is removed from the mold in one piece. The particulate metal article is then placed in a suitable furnace containing a reducing atmosphere and heated to a suitable temperature above about 1300° F., preferably about 1550° F., whereby the iron phosphate bond is reduced, unreacted iron oxide is reduced to iron, residual phosphate material is eliminated and the iron particles are, to at least some extent, sintered together. Suitable braze alloy in molten form is then placed in the vicinity of the porous particulate article which is still under the reducing atmosphere. The braze alloy readily infiltrates the sintered particulate article by capillary action and upon cooling of the article in the reducing environment a solid, strong iron-braze alloy tool is formed. The tool piece is removed from the furnace, subjected to any suitable minor machining or cleaning operations, and is then ready to serve as a useful tool member as required.

In accordance with my invention it is noted that the metal particles, molded in the shape of a tool, are initially held in the desired configuration by means of a suitable metal-phosphate chemical bond, which bond is ultimately chemically reduced and replaced with a brazed metallurgical bond. In this way loose particles may be initially readily formed into a relatively porous article of predetermined shape, bonded together therein for further processing and ultimately transformed into a solid article having utility as a tool member.

Other objects and advantages of my invention will become more apparent from a detailed description thereof which follows. During the description reference will be made to the attached drawing which is a schematic flow diagram depicting a preferred mode of practicing the process of my invention.

In practice of my invention, it is necessary, at one step, to form a metal phosphate bond between a large number of metal particles and, at a later stage, reduce the chemical bond and substitute a metallurgical bond for it. Phosphoric acid is known to react with a number of metal oxides to form complex metal phosphate materials which have some utility as adhesives. Some of these metal phosphates are resistant to very high temperatures. Since, in accordance with the practice of my invention, it is necessary to chemically reduce the metal phosphate bond and any unreacted metal oxide to permit the infiltration of molten braze alloy, it is preferred that only $Fe_3O_4$ or CuO be employed as the metal oxide component in my process. For purposes of illustration I shall first describe the practice of my invention in connection with the use of the specified iron oxide.

In general, my invention is particularly useful in connection with the preparation of dies such as are employed in connection with metal forming, die casting, plastic injection molding, vacuum forming and the like. In the making of dies or die inserts by my method it generally is satisfactory to prepare a wooden pattern of the article or the portion of the article which the die is intended to form. Referring to the drawing herein a wooden pattern is depicted at 10. Pattern 10 is placed on a suitable metal base plate 12 and a generally open cylindrical retainer wall 14 is placed on base plate 12 around the pattern 10. The pattern, retainer wall and base plate cooperate to form an inexpensive mold 16 for the forming of loose iron particles into an iron compact.

Finely divided iron shot, preferably about 7 to 14 mils in maximum dimension, is heated in air at 900°–1400° F., for about ten minutes to provide a blue iron oxide coating, $Fe_3O_4$, on the surface of the particles. Due to the brief heating period only the surface of the particle is oxidized. The oxide coated iron particles are then mixed with commercial 85% phosphoric acid in a suitable mixer. When more than a few pounds of oxidized iron shot is to be mixed with phosphoric acid it may be advantageous to provide a mechanical mixer, such as a dough mixer. In general, about 6 to 7 milliliters of concentrated phosphoric acid is sufficient for each pound of iron shot employed. Preferably concentrated phosphoric acid is employed because it appears to react more slowly with iron oxide and then prolongs the pot life of the iron shot-acid mixture. It is also preferred that the iron shot be initially cooled to 0° F.±10° F. to slow the set-up time.

The phosphoric acid-oxide coated iron shot 18 is removed from the mixer and tamped around pattern 10. Preferably the acid wetted iron shot is added in layers over the pattern, each layer being tamped down and packed in with a hand ram 20. It is preferred that the hand ram be made of wood to avoid damage to the pattern. The shot added to the mold should be tamped in as densely as possible to obtain the maximum strength from the iron phosphate adhesive bond. The tamped shot-acid mixture is allowed to stand up for up to about two hours to harden. Typically, parts containing about 5 to 10 pounds of iron shot require 1–1½ hours to harden, parts containing 40–50 pounds of iron shot have been found to take 1½–2 hours to harden. A suitable setting time may be determined in each instance by some experimentation.

When the iron shot compact has hardened to a self-sustaining mass 22, it is removed from the mold by employing a pattern puller or other suitable device as has heretofore been employed in foundry practice. The part is then ready to be subjected to a hot reducing atmosphere for the purpose of reducing the iron phosphate bond and partially sintering the iron particles together. A graphite container tray 24 is provided to facilitate sintering and brazing operations. The self-sustaining iron phosphate bonded iron compact is set on the graphite tray together with a mass of a suitable brazing alloy 26. A brass alloy consisting of 80% copper and 20% tin having a melting point of about 1660° F. is suitable for this purpose. The brass is simply set beside the iron compact on the graphite tray. The tray, together with its contents, is placed in a heat treating furnace adapted to contain a reducing atmosphere. Examples of suitable reducing atmospheres include dissociated ammonia having a 0° F. dew point; natural gas; and a mixture of 40% by volume hydrogen, 20% carbon monoxide and 40% nitrogen, having a dew point of about 35° F. or lower. The furnace is flooded with the reducing atmosphere and the contents thereof heated to about 1550° F. Three important effects are believed to occur while the compact is subjected to the reducing atmosphere at the stipulated temperature. The iron phosphate bond is reduced and residual phosphate or phosphorous containing material burned off or otherwise eliminated. Iron oxide is reduced to iron to facilitate the subsequent wetting of the surface of the particles with a braze alloy and finally some diffusion of iron takes place to sinter the mass maintaining it in a self-sustaining condition during the heating operations. The furnace is held at 1550°–1660° F. for about twenty hours to accomplish the reduction and sintering operation. The furnace is then further heated to about 1800° F. and held for about 1¼ hours. At this higher temperature the brass bar adjacent the iron compact on the graphite tray melts and, if the tray is tilted slightly, the copper base brazing alloy flows to the porous iron compact. It is absorbed by the compact like a sponge and completely infiltrates the porous body. Some alloying takes place between the brass and the iron and the copper base brazing alloy solidifies to form a dense, solid die member. The brass brazed, iron particle body 28 is cooled within the reducing atmosphere and ultimately withdrawn from the furnace.

At this point any final touching up operations such as cleaning or machining the die may be undertaken as desired. The as-infiltrated tool produced as described above may also be heat treated to produce a slight increase in hardness. It will also be recognized that other operations such as copper, nickel or chromium plating may be undertaken with respect to one or more surfaces of the article. The article may also be welded or brazed to another tool member to build up a composite structure.

In general, my process may be employed to produce tool members of any desired configuration. The tensile strength of the structure is closely related to that of the braze alloy itself in view of the way in which the article is formed. However, articles produced in accordance with my method are strong under compression loads and therefore find particular utilization as die members or as die inserts or pressure reactor inserts which are supported within strong frame structure. Moreover, articles also may be formed in accordance with my method to act as electrodes in electric discharge machining and electrochemical machining operations. They may be shaped to serve as fixtures in assembly line operations, as patterns in foundry operations and in many other areas where tools are required.

In the example of the practice of my invention which was set forth above, iron shot was employed and a thin iron oxide film was generated on the surface of the iron particles by means of a suitable oxidation reaction. This technique is preferred when iron particles are employed as the initial metallic structural element of the body to be produced. However, when metals other than iron or copper are employed as the particulate element of the tool structure it is necessary to coat the particles of such a metal with finely divided powdered magnetic iron oxide, $Fe_3O_4$, or cupric oxide, $CuO$. In general only a relatively small amount of oxide powder, about one to two percent by weight of the metal particles, is required. In this way, a coating of iron oxide or cupric oxide powder is built up on the surface of a larger metal particle somewhat similar to the coating of iron oxide which was integrally formed on the iron shot. Thus, any metal in particle form may be employed which has a melting point above about 1300° F., the approximate lowest temperature at which the iron-phosphate or copper-phosphate bond is reduced at a practical rate in commercial reducing atmospheres, and above the melting point of the braze alloy which is employed to infiltrate the porous metal compact. By way of example, I have made electrical discharge machine electrodes from tungsten particles having a maximum dimension of about 14 mils by coating the tungsten particles with extremely finely divided cupric oxide. The cupric oxide particles were about as fine as normal rouge or face powder. The cupric oxide coated tungsten particles were then wetted with phosphoric acid as described above and molded into a predetermined electrode configuration. The molded electrode was allowed to sit until self-sustaining and then transferred to a suitable furnace wherein the cupric phosphate bond was reduced and electrode body sintered. The sintered tungsten particles were infiltrated with the copper base braze alloy defined above to form a solid electrode member.

It is preferred to reduce the metal phosphate bond at a temperature above about 1300° F. but below the melting point of the metal particles being employed in forming the tool member. At higher temperatures, of course, the reduction reaction is completed more rapidly and more sintering of the metal particles is obtained. However, in many instances of the practice of my invention it is advantageous to place a block of the braze alloy with the molded particulate compact in the reduction furnace. Under these circumstances the metal phosphate bond can be reduced by heating the compact at a temperature just below the melting range of the braze alloy until the reduction is complete, the temperature of the furnace then being increased to a level within the liquid range of the braze alloy for the infiltration step.

In the examples given above, it was indicated that preferably the maximum dimension of the metal particle was about 14 mils. This upper limit has been found to provide excellent surface detail in the formation of die members. As a practical matter the dimensions of the metal particles or shot used in accordance with my invention are limited only by the detail that is desired to be obtained in the configuration of the tool member. However, sufficient surface area must be provided to obtain an adequate chemical bond between the metal particles until they can be infiltrated with the braze alloy.

Concentrated phosphoric acid is specified for mixing with the oxide-coated metal particles because the pot life working time of the mixture is extended. If phosphoric acid is diluted with water, it becomes more reactive with the metal oxide and the powdered metal sets up more rapidly.

While my invention has been described in terms of a few specific preferred embodiments, it will be recognized that other forms could readily be adapted by one skilled in the art and therefore the scope of my invention should be limited only by the following claims.

I claim:
1. A method of making a shaped tool element comprising
   providing a quantity of metal particles,
   coating said metal particles with a metal oxide selected from the group consisting of CuO and $Fe_3O_4$,
   mixing the metal oxide coated particles with an amount of phosphoric acid which is at least sufficient to wet and coat said metal oxide coated particles,
   immediately forming a quantity of the phosphoric acid coated particles into a compact body in the configuration of a desired tool,
   supporting said compact body of particles while said phosphoric acid reacts with said metal oxide to form metal phosphate which chemically bonds the coated particles together into a body which is self-sustaining when moved,
   heating said body in a chemically reducing atmosphere to reduce the metal-phosphate bond and to reduce residual metal oxide,
   infiltrating the heated particulate metal body while it is still in said reducing atmosphere with a suitable molten braze alloy which wets the particles of the metal body, brazing them into a solid tool member, and
   cooling said tool member in said reducing atmosphere.

2. A method of making a shaped tool member from metal particles comprising
   providing a quantity of metal particles having a surface coating layer of a metal oxide selected from the group consisting of CuO and $Fe_3O_4$,
   mixing a quantity of phosphoric acid with said oxide coated metal particles sufficient to coat the surfaces of said particles,
   immediately forming a quantity of the phosprodic acid coated metal particles into a compact coherent body in the configuration of a desired tool,
   supporting the formed body in said configuration until said phosphoric acid has chemically reacted with said metal oxide to form a metal phosphate bond joining the individual metal particles together in a body which is self-sustaining when moved,
   placing the formed body in a suitable furnace containing a reducing gaseous atmosphere,
   providing solid braze alloy in the vicinity of said formed body,
   heating said formed body and said solid braze alloy to a first elevated temperature above about 1300° F. but below the melting range of said braze alloy for a time sufficient to reduce said metal phosphate bond and to reduce residual metal oxide,
   further heating said formed body and said braze alloy to a second elevated temperature above said first elevated temperature to melt said braze alloy.
   infiltrating said body with said braze alloy to form a brazed particulate body,
   cooling said brazed particulate body in said reducing atmosphere, and
   removing the brazed particulate tool from said reducing atmosphere.

3. A method of making a tool, a die member or the like from iron particles comprising
   providing a quantity of finely divided iron particles of about 0.007" to 0.014" in maximum dimension, said particles having a coating layer of $Fe_3O_4$ on the surface thereof,
   mixing the oxide coated iron particles with sufficient concentrated phosphoric acid to coat the surface of said oxide coated particles,
   molding the acid-particle mixture into the configuration of a desired tool, die member or the like,
   permitting the molded tool to stand until the phosphoric acid and iron oxide react to form an iron phosphate chemical bond between the individual iron particles thereby rendering the molded tool self-sustaining if moved,
   heating the molded tool in a gaseous reducing atmosphere at a temperature about 1400°–1600° F. for a time sufficient to reduce the iron phosphate bond and to reduce any iron oxide,
   further heating said molded tool in said reducing atmosphere to about 1700°–1900° F. and infiltrating the particulate molded tool with a molten copper base braze alloy to form a solid, brazed together particulate tool member,
   cooling said tool member in said reduced atmosphere, and
   removing said tool member from said reducing atmosphere.

4. A method of making a tool member from metal particles comprising
   providing a quantity of finely divided metal particles,
   mixing a powdered metal oxide selected from the group consisting of CuO and $Fe_3O_4$ with said metal particles, said metal oxide powder being of sufficiently fine particle size so as to coat the surface of said metal particles,
   mixing the metal oxide coated metal particles with an amount of phosphoric acid sufficient to wet and coat said metal oxide coated metal particles,
   immediately forming a quantity of the phosphoric acid and metal oxide coated particles into a compact body of desired tool configuration,
   supporting said compact body of particles while said phosphoric acid reacts with said metal oxide to form a metal phosphate which chemically bonds the coated particles together into a body which is self-sustaining when moved,
   heating said body in a chemically reducing atmosphere to reduce the metal phosphate bond and to reduce any metal oxide, infiltrating the heated particulate metal body while it is still in said reducing atmosphere with a suitable molten braze alloy which wets the particles of the metal body, brazing them into a solid tool member, and cooling said tool member in said reducing atmosphere.

References Cited

UNITED STATES PATENTS

| | | | |
|---|---|---|---|
| 2,853,401 | 9/1958 | Mackiw | 75—212X |
| 3,320,057 | 5/1967 | Palmateer | 75—206 |
| 3,375,109 | 3/1968 | Peters | 75—212 |

FOREIGN PATENTS

| | | | |
|---|---|---|---|
| 810,774 | 3/1959 | Great Britain | 75—212 |

CARL D. QUARFORTH, Primary Examiner

A. J. STEINER, Assistant Examiner

U.S. Cl. X.R.

75—200, 208, 224